April 22, 1941.  J. A. WIRTANEN ET AL  2,239,348
HYDRAULIC BRAKE SAFETY UNIT
Filed May 5, 1939
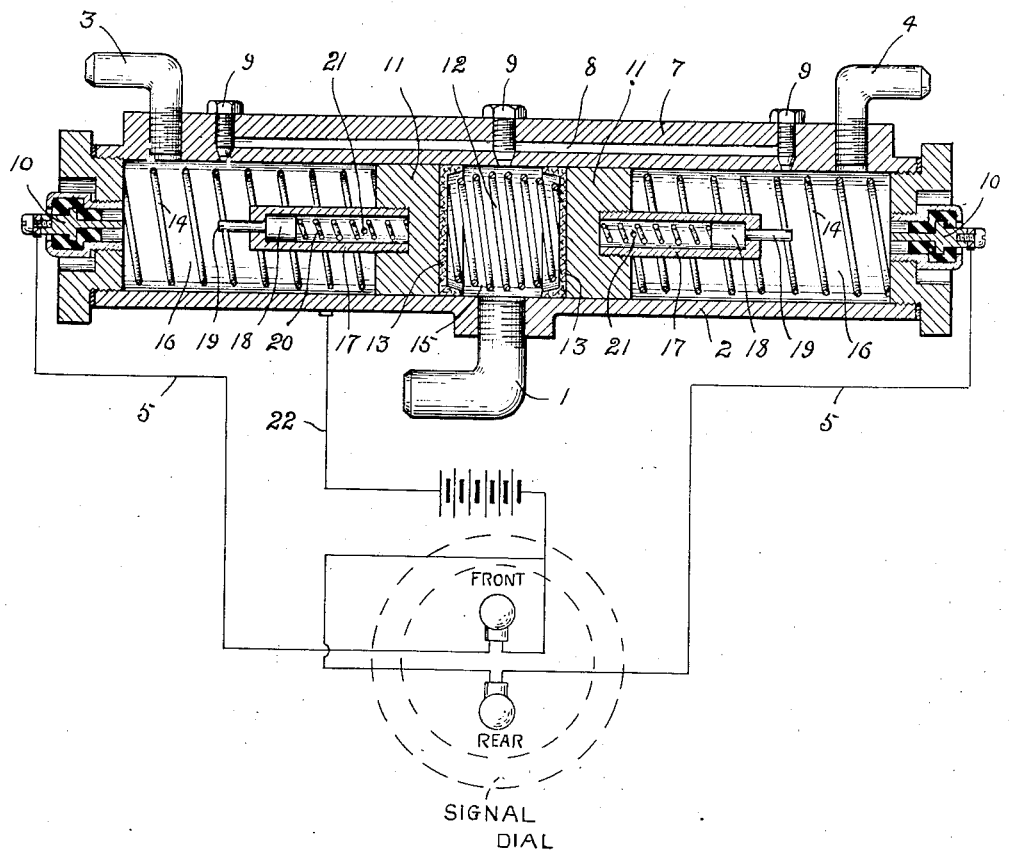
INVENTORS.
John A. Wirtanen &
Axel M. Wirtanen.
BY
Geo. Stevens ATTORNEY.

Patented Apr. 22, 1941

2,239,348

UNITED STATES PATENT OFFICE 2,239,348

HYDRAULIC BRAKE SAFETY UNIT

John A. Wirtanen Chisholm, and Axel M. Wirtanen, Eveleth, Minn.; said John A. Wirtanen, deceased, assignor, by order of court, to Elsie Wirtanen Application May 5, 1939, Serial No. 272,000

4 Claims. (Cl. 200—82)

This invention relates to safety units for fluid operated brakes, the principal object being to simplify such a unit and improve the efficiency thereof, it being well known that somewhat similar units have been employed with more or less inefficiency.

Another object is to provide such a device having simple means for manual compensation of leakage in the fluid circuit.

Still another object is to provide simple means for repeated signalling in case of trouble in either pair of or individual vehicle wheel brakes, at each application of the brakes, for a predetermined period of time, and that with a minimum loss of fluid from the system.

Further objects and advantages of the invention will appear as the description of one specific embodiment thereof proceeds.

Referring now to the accompanying drawing, forming part of this application, and wherein like reference characters indicate like parts:

The illustration is that of a central vertical sectional view of the unit, showing one embodiment of the invention.

Inasmuch as there has been considerable development in this art, and the action and application of fluid operated brakes for automobiles is well known, there being provided for the operation of such a foot controlled master cylinder and reservoir supply for same, together with the necessary pipe lines leading one to the rear wheels and another to the front wheels of the automobile, it is deemed superfluous to make additional showing than the view here presented of the auxiliary unit for the purpose of control of the circuit from the master cylinder to the wheels of the vehicle.

At 1 is illustrated the pipe line leading from the master cylinder to the safety signalling cylinder 2, embodying the present invention. From adjacent either end of this cylinder 2 there are pipe lines 3 and 4 leading respectively to the front and rear wheel brakes of the vehicle.

The cylinder 2 is of ordinary construction except that on one side thereof there is a slight enlargement 7 in which enlargement is provided the by-pass channel 8 communicating with both ends of the cylinder as well as the middle thereof, and which communicating connections are controlled as by suitable thumb or other screws indicated at 9. At either end of this cylinder and substantially axially thereof is installed a suitable insulated electric terminal 10 which forms part of the signalling circuit indicated by the numeral 5.

Within the cylinder 2 are installed two spaced floating pistons 11, they being held in predetermined spaced relation substantially as shown by the expansive helical spring 12 which of course is provided at either end thereof with suitable impinging gaskets indicated at 13 to insure against leakage of fluid during the action of the piston. Upon the opposite side of each piston 11 and installed within the cylinder 2 is a similar expansive helical spring 14, the tension of which springs is such as to maintain the pistons normally in proper spaced relation, as illustrated. The fluid supply 1 from the master cylinder to the center of the cylinder 2 discharges into the chamber 15 intermediate of the pistons 11, and in which chamber the spring 12 is installed, while the fluid connections 3 and 4 from the brakes to be controlled are shown as communicating with the chambers within the cylinder 2 of the unit upon the opposite sides of the pistons, said chambers being indicated at 16.

It is of course understood that before operation of the device the system must be provided with the necessary fluid for such operation, and to accomplish which both ends of the cylinder 2 must be adequately filled with the fluid. For this purpose the ports controlled by the screws 9 must be regulated to provide open communication to both ends as well as the middle of the cylinder through the by-pass 8. Thus when fluid is admitted from the connection 1 into the chamber 15 filling the same, it may pass through the by-pass 8 and ports at either ends thereof into the chambers 16 filling the same and the lines 3 and 4 to the brake mechanism on the wheels of the vehicle. Then on closing the ports controlled by the screws 9 the device is in readiness for operation as a safety signal means, in that when fluid is forced into the chamber 15 intermediate of the pistons 11, as for example when the vehicle brake pedal is depressed, the pistons will be forced apart, and the liquid in the chambers 16 caused to function normally in the operation of the braking mechanism. However, should a leak from any cause, or abnormal wear of the brake shoes, occur, so as to result in either piston moving more than a normal predetermined distance, it will bring into action the signal means, hereinafter described.

This signal means comprises an auxiliary cylinder 17 screw threadedly mounted within the outer face of each piston 11. Each auxiliary cylinder 17 has installed therein a reciprocal piston 18 carried upon the inner end of the terminal stem 19, which protrudes through the end of each cylinder 17 and at the opposite end of the piston 18 within each cylinder is an expansive helical spring 20 for holding the terminal stem 19 in its outermost position. Suitable holes 21 are provided through the wall of each cylinder 17 to permit of free circulation of oil therein. Now it is to be understood that the cylinder 2 is suitably grounded for example as indicated at 22 for completion of the electric circuit when the signalling operation occurs, and when either of the terminal stems 19 engage their respective opposed terminals 10, the circuit 5 will be closed to its respective lamp and thus cause the desired signal. However it is to be noted that ample space is allowed for normal action of each piston 11 within the cylinder for many repeated applications of the brake when in normal condition, or the gradual increasing in distance of action through normal wear until such time as the terminal stem 19 engages the opposite terminal in its circuit. Even after the stem 19 engages its respective opposite terminal when the brakes are applied there is provided means for repeated signalling at each application of the brakes for a predetermined number of times before all braking action would cease; this being due obviously to the yieldability of the terminal stem within its auxiliary cylinder and which is controlled by the spring 20. Thus it is deemed we have provided not only a practical safety signal means for hydraulic brake systems, but a very simple and efficient structure that provides for repeated warning signals to the operator of the vehicle that the brake system needs attention, and that before the brake system completely fails.

From the foregoing it is apparent that a single cylinder installation of this type will adequately function for the control of the front and rear brakes in pairs, that is to say for example that both front brake mechanisms are controlled by the connection 3, and both rear brakes by the connection 4. However in some installations it may be desirable to have the signal indicate which specific wheel brake was faulty, and in such cases a double safety cylinder could be provided, and wherein there would be two connections 3, one to each front wheel brake, and two connections 4, one to each rear wheel brake, and thus provide an accurate check on the operation of the brakes of each wheel; the broad concept of a signal to indicate faulty operation of each wheel brake, however, being old in the art.

Having thus described our invention, what we claim and desire to secure by Letters Patent, is:

1. A circuit closer comprising, an elongated fluid filled cylinder, an electric circuit terminal in either end of said cylinder, a pair of spaced pistons within said cylinder, means intermediate of and holding said pistons in spaced relation, means for counteracting the force of said first mentioned means in keeping each of said pistons a predetermined distance from their respective ends of said cylinder, means carried by each piston for cooperative engagement with the terminal of an electric circuit in its respective end of said cylinder when the fluid within either end of said cylinder falls below a predetermined amount.

2. A circuit closer comprising an elongated fluid filled cylinder, a pair of spaced fluid actuated pistons within said cylinder, means for the access of fluid to said cylinder intermediate of and to move said pistons, a spring actuated floating piston carried by either fluid actuated piston, an independently yieldable circuit contact element, associated with each floating piston, and cooperative contact elements at either end of said cylinder, said contact elements being held in normally spaced relation by the fluid within said cylinder, and whereby when fluid within said cylinder falls below a predetermined volume said elements may contact each other and close a circuit.

3. A circuit closer comprising an elongated fluid filled cylinder, having a central fluid inlet, reciprocable pistons within said cylinder, each operable toward an end of said cylinder by fluid entering said central inlet, a yieldable contact element carried by the outer surface of each piston, and a stationary contact element carried by each end of said cylinder, the fluid normally within said cylinder preventing said elements from contacting each other, and whereby when fluid within said cylinder falls below a predetermined volume, said elements may contact each other and close a circuit.

4. A circuit closer comprising an elongated fluid filled cylinder having a central fluid inlet, a terminal of an electric circuit at either end of said cylinder, opposed pistons operable within said cylinder, one upon either side of said inlet and adapted to be actuated by fluid entering the cylinder through said inlet, and a yieldable contact element carried by each piston, for cooperative engagement with the terminal of an electric circuit in each end of said cylinder when the fluid within either end of said cylinder falls below a predetermined volume.

JOHN A. WIRTANEN.
AXEL M. WIRTANEN.